United States Patent [19]

Bacon

[11] 3,785,836
[45] Jan. 15, 1974

[54] HIGH MODULUS INVERT ANALOG GLASS COMPOSITIONS CONTAINING BERYLLIA

[75] Inventor: James F. Bacon, Manchester, Conn.

[73] Assignee: United Aircraft Corporation, East Hartford, Conn.

[22] Filed: Apr. 21, 1972

[21] Appl. No.: 246,295

Related U.S. Application Data

[63] Continuation-in-part of Ser. No. 874,674, Nov. 6, 1969, abandoned.

[52] U.S. Cl. ................... 106/50, 106/52, 106/54
[51] Int. Cl. ................................................ C03c 3/04
[58] Field of Search ..................... 106/50, 52, 54

[56] References Cited
UNITED STATES PATENTS

| | | | |
|---|---|---|---|
| 3,483,072 | 12/1969 | Cox et al. ..................... | 106/50 UX |
| 2,978,341 | 4/1961 | Bastian et al. ................ | 106/50 |
| 3,573,078 | 3/1971 | Bacon ........................... | 106/50 |
| 2,805,166 | 9/1957 | Loffler ......................... | 106/52 |
| 3,127,277 | 3/1964 | Tiede ............................ | 106/50 |
| 3,183,104 | 5/1965 | Thomas ......................... | 106/50 |

FOREIGN PATENTS OR APPLICATIONS 37-1121  4/1962  Japan .................................. 106/52

Primary Examiner—Helen M. McCarthy
Attorney—John D. Del Ponti

[57] ABSTRACT

Glass compositions having a Young's modulus of at least 15 million psi and a specific modulus of at least 110 million inches consisting essentially of, in mols, 10–45% $SiO_2$, 2–15% $Li_2O$, 3–34% BeO, 12–36% of at least one bivalent oxide selected from the group consisting of CaO, ZnO, MgO and CuO, 10–39% of at least one trivalent oxide selected from the group consisting of $Al_2O_3$, $B_2O_3$, $La_2O_3$, $Y_2O_3$, $Fe_2O_3$ and the mixed rare earth oxides, the total number of said bivalent and trivalent oxides being at least three, and up to 10% of a tetravalent oxide selected from the group consisting of $ZrO_2$, $TiO_2$ and $CeO_2$.

3 Claims, No Drawings

3,785,836

1

HIGH MODULUS INVERT ANALOG GLASS COMPOSITIONS CONTAINING BERYLLIA

BACKGROUND OF THE INVENTION

This application is a continuation-in-part of application Ser. No. 874,674 filed Nov. 6, 1969 by the same inventor, now abandoned.

The invention described herein was made in performance of work under a NASA contract and is subject to the provisions of Section 305 of the National Aeronautics and Space Act of 1958, Public Law 85-568 (72 Stat. 435; 42 USC 2457).

This invention relates to high modulus glass and glass compositions and more particularly relates to invert beryllia-containing glasses having a Young's modulus of at least 15 million psi and a specific modulus of at least 110 million inches.

In the present age, there has been a continuing search for glasses of high modulus and low density, capable for use as reinforcements, preferably in fiber form, in composite structures ranging from high strength missile cases and helicopter blades to propeller spinners and gas turbine engine parts. Glass offers promise as the reinforcements in such applications since it may be quickly and cheaply produced by relatively conventional techniques and, generally, presents no compatibility problems with the matrix materials with which it is normally used. There is a need, however, to provide glass formulations which possess a high modulus of elasticity, and more particularly a high modulus/density ratio. It is more preferable if the glass possess the aforementioned two characteristics in combination with an appropriate liquidus-viscosity relationship to permit fiberization.

SUMMARY OF THE INVENTION

The glass compositions of the present invention are a high modulus, low density invert glass which, in their preferred form consist essentially of a combination of silica, the monovalent oxide of lithium, beryllia, one or more bivalent oxides selected from the group consisting of CaO, ZnO, MgO and CuO, at least one trivalent oxide selected from the group consisting of $Al_2O_3$, $B_2O_3$, $La_2O_3$, $Y_2O_3$, $Fe_2O_3$ and the mixed rare earth oxides. More particularly, the inventive glasses contemplated are those having a Young's modulus of at least 15 million psi and a specific modulus of at least 110 million inches which consist essentially of 10–45 mol % $SiO_2$, 2–15 mol % $Li_2O$, 3–34 mol % BeO, 12–36 mol % of at least one bivalent oxide selected from the group consisting of CaO, ZnO, MgO and CuO, 10–39 mol % of at least one trivalent oxide selected from the group consisting of $Al_2O_3$, $B_2O_3$, $La_2O_3$, $Y_2O_3$, $Fe_2O_3$ and the mixed rare earth oxides, the total number of bivalent and trivalent oxides being at least three, and up to 10% of a tetravalent oxide selected from the group consisting of $ZrO_2$, $TiO_2$ and $CeO_2$. It will be noted that the glasses are comprised of only one alkali oxide and a combination of alkaline earth oxides and trivalent and tetravalent oxides.

More particularly, the inventive glasses are those having a Young's modulus of at least 15 million psi and a specific modulus of at least 110 million inches which consist essentially of 10–45 mol % $SiO_2$, 2–15 mol % $Li_2O$, 3–34 mol % BeO, 12–36 mol % of at least one bivalent oxide selected from the group consisting of CaO, ZnO, MgO and CuO, MgO being present in the amount of 2–24 mol %, 10–39% of at least one trivalent oxide selected from the group consisting of $Al_2O_3$, $B_2O_3$, $La_2O_3$, $Y_2O_3$, $Fe_2O_3$ and the mixed rare earth oxides, the total number of said bivalent and trivalent oxides being at least three, and up to 10 mol % of a tetravalent oxide selected from the group consisting of $ZrO_2$, $TiO_2$ and $CeO_2$. Preferably, the bivalent oxides are present in amounts of up to 30 mol % CaO, up to 15 mol % ZnO, 2–24 mol % MgO and up to 10 mol % CuO and the trivalent oxides are present in amounts of up to 16 mol % $Al_2O_3$, up to 14 mol % $B_2O_3$, up to 10 mol % $La_2O_3$, up to 14 mol % $Y_2O_3$, up to 3 mol % $Fe_2O_3$ and up to 12 mol % mixed rare earth oxides. The tetravalent oxides, when present, are in amounts of up to 10 mol % $ZnO_2$, up to 4 mol % $TiO_2$ and up to 3 mol % $CeO_2$.

In several preferred embodiments, formulations having a Young's modulus of at least 19 million psi and a specific modulus of at least 150 million inches that are readily formed into fibers having a relatively high fiber modulus, above 16 million psi, are described. These include glasses consisting essentially of about, in mols:

39% $SiO_2$, 6% $Li_2O$, 25% BeO, 6% CaO, 12% MgO, 12% $Al_2O_3$, 10% $Y_2O_3$ and 2% $CeO_2$;

42–45% $SiO_2$, 3% $Li_2O$, 15–18% BeO, 12–15% MgO 12–15% $Al_2O_3$ and 7–10% $Y_2O_3$; and 42% $SiO_2$, 3% $Li_2O$, 15% BeO, 3% ZnO, 15% MgO, 12% $Al_2O_3$ and 10% $Y_2O_3$.

In the latter two formulations, the glasses have a Young's modulus of at least 19 million psi, a specific modulus of at least 160 million inches and a fiber modulus of at least 18 million psi.

In several formulations, glasses having a Young's modulus of at least 20 million psi with a specific modulus of at least 150 million inches are described.

The features of the invention will be discussed in greater detail in the description which follows or will be evident therefrom to those skilled in the art.

DESCRIPTION OF THE PREFERRED EMBODIMENTS

In general, it will be appreciated that the glasses of the present invention are a combination of silica, the alkali oxide lithia, beryllia and a combination of alkaline earth, trivalent and tetravalent oxides. Like known invert glasses, such as those of Trap and Stevels, which, however, are comprised of several alkaline oxides and several kinds of alkaline earth oxides but do not include any trivalent oxides, the glasses of the present invention contain so little silica that a continuous silica network is not possible. It will be appreciated that such glasses may be characterized by a structural parameter Y which denotes the average number of bridging 0 ions. According to a rule of Zachariason for silicate glass formation, which postulates that these silicate glasses should have a three-dimensional network in which the $SiO_4$ tetrahedra share approximately three of their four oxygens with neighboring tetrahedra, commercial silicate glasses have Y values between 3.0 and 3.5. For ternary soda lime silica glasses it is not possible to lower appreciably the parameter Y below 3.0 and still obtain stable glasses. In contrast, the strongly "basic" or invert glasses of this invention generally have Y values of 2.0 or below and in some cases values of zero. In calculating the parameter Y, the following formula is used:

$$Y = 6 - 200/P$$

where P = mol % $SiO_2$. It is readily seen that for an orthosilicate such as $Na_4SiO_4$ with 33⅓ mol % $SiO_2$, Y has a value of 0 while for a meta silicate with a 40 mol % $SiO_2$, Y has a value of 1.0 and leads to the formation of a single tetrahedra. As will be seen hereinafter, all of the glasses of this invention have a total $SiO_2$, content of less than 50 mol %, more precisely 45 mol % or less, and in some cases as little as 10%. It thus becomes apparent that the prior concept that silicate glasses must have a three-dimensional network of $SiO_4$ tetrehedra cannot be maintained, even if the network modifiers are cations of the noble gas type. It is therefore considered that the present glasses lie between the tetrahedral structures of the conventional special glasses such as the Morey-Eastman Kodak optical glasses. In any event, the advantages of the present glasses will be recognized, not only because of their consistently high Young's modulus, specific modulus and, in some cases, ready fiberizability, but also because they permit lowering of the liquidus temperature, greatly increase the field of glass formation and allow the study of the effect of the atomic structure of a glass upon its properties. As indicated above, invert glasses have been made according to the present invention with an elastic modulus in excess of 20 million pounds per square inch.

It has been determined that while low atomic number oxide components are a primary choice in achieving high modulus glass compositions of high specific modulus, they are not the only choice since contributions per mol % to Young's modulus of several of the heavier elements were high, as follows:

| Oxide | Contribution to Young's modulus per mol % (kilobars) |
|---|---|
| $SiO_2$ | 7.3 |
| $Al_2O_3$ | 12.1 |
| CaO | 12.6 |
| $Li_2O$ | 7.0 |
| $B_2O_3$ | 7.2 |
| ZnO | 1.72 and rising with increasing $R_2O$ |
| $TiO_2$ | 13.3 |
| BeO | 19.0 |
| $ZrO_2$ | 18.9 |
| MgO | 12.0 and rising with decreasing $R_2O$ and $SiO_2$ to 14.8 |
| $Y_2O_3$ | 24.3 |
| $La_2O_3$ | 22.4 |
| $Ce_2O_3$ | 18.6 |

It thus has been found that the judicious use of the heavier oxides is obviously to be considered in cases where they improve viscosity, surface tension, working range and other characteristics.

It is to be noted that several rules which are predicated on experience with glasses comprised of silica networks do not hold true for the non-network invert glasses. It has, for example, been found that substitution of $B_2O_3$ for $SiO_2$ fails to decrease the density while the substitution of CuO for ZnO markedly lowers the density. It has also been found that the addition of beryllia to glasses having appreciable borate content does not raise Young's modulus as much as does the addition of beryllia to a silica-alumina-magnesia glass.

All of the compositions investigated were made by melting 500 gram batches of the specified raw materials in high purity (99.9%) alumina crucibles in air using kilns heated by Super-Kanthal hairpin electrical resistance elements. The starting materials used were 5 micron particle-size high purity silica, high purity alumina of 325 mesh, laboratory reagent grade magnesium oxide, 99.9% lanthanum oxalate, and other comparable materials such as reagent grade zinc carbonate or calcium carbonate. These materials yielded a water-white optical grade glass free of seed, stone and bubbles when properly compounded and held at temperatures of 1,000°–1,650° C for at least 2 hours. With the above technique, alumina crucibles of even slightly lower purity (99.3–99.7%) cannot be used. It is recognized however that the glasses may be prepared in beryllia crucibles in air and in the same kilns or in platinum crucibles in air in a platform kiln or in tungsten crucibles in purified argon or vacuum atmospheres.

The compositions of some of the representative glasses formulated in the course of the experimental program are set forth in Table I.

Table I

Compositions of Representative Glasses (Mol Percent)

| Ex. | $SiO_2$ | $Li_2O$ | BeO | CaO | ZnO | MgO | CuO | $Al_2O_3$ | $B_2O_3$ | $La_2O_3$ | $Y_2O_3$ | $Fe_2O_3$ | $Re_2O_3$ | $ZrO_2$ | $TiO_2$ | $CeO_2$ |
|---|---|---|---|---|---|---|---|---|---|---|---|---|---|---|---|---|
| 1 | 30 | 12 | 22 | 12 | — | 12 | — | 12 | — | — | — | — | — | — | — | — |
| 2 | 25 | 15 | 15 | — | 15 | 15 | — | 15 | — | — | — | — | — | — | — | — |
| 3 | 30 | 10 | 10 | — | 10 | 20 | — | 10 | — | — | 10 | — | — | — | — | — |
| 4 | 30 | 10 | 10 | — | 10 | 20 | — | 10 | — | — | — | — | — | 10 | — | — |
| 5 | 25 | 10 | 15 | — | 10 | 20 | — | 10 | — | — | 10 | — | — | — | — | — |
| 6 | 30 | 10 | 10 | — | 10 | 20 | — | 10 | — | 10 | — | — | — | — | — | — |
| 7 | 24 | 13 | 24 | 13 | — | 13 | — | 13 | — | — | — | — | — | — | — | — |
| 8 | 25 | 10 | 10 | — | 10 | 15 | — | 10 | — | — | 10 | — | — | 10 | — | — |
| 9 | 30 | 10 | 20 | — | 10 | 10 | — | 10 | — | 10 | — | — | — | — | — | — |
| 10 | 24 | 12 | 3 | 12 | 8 | 16 | — | 3 | 10 | — | — | — | 12 | — | — | — |
| 11 | 10 | 8 | 34 | 30 | 4 | 2 | — | — | 6 | 4 | — | — | — | — | 2 | — |
| 12 | 24 | 12 | 14 | 12 | — | 12 | — | — | 10 | — | — | — | 12 | — | 4 | — |
| 13 | 39 | 6 | 25 | 6 | — | 12 | — | 12 | — | — | 10 | — | — | — | — | 2 |
| 14 | 25 | 5 | 3 | 3 | — | 20 | 2 | 8 | 14 | — | 14 | 3 | — | — | 3 | — |
| 15 | 45 | 3 | 15 | — | — | 15 | — | 12 | — | — | 10 | — | — | — | — | — |
| 16 | 45 | 3 | 15 | — | — | 15 | — | 15 | — | — | 7 | — | — | — | — | — |
| 17 | 45 | 3 | 18 | — | — | 12 | — | 15 | — | — | 7 | — | — | — | — | — |
| 18 | 42 | 3 | 15 | — | — | 15 | — | 15 | — | — | 10 | — | — | — | — | — |
| 19 | 42 | 3 | 15 | — | 3 | 15 | — | 12 | — | — | 10 | — | — | — | — | — |
| 20 | 42 | 3 | 15 | — | — | 20 | — | 10 | — | — | 10 | — | — | — | — | — |
| 21 | 40 | 5 | 18 | — | — | 18 | — | 9 | — | — | 10 | — | — | — | — | — |
| 22 | 40 | 2 | 18 | — | 3 | 18 | — | 9 | — | — | 10 | — | — | — | — | — |

Table I — Continued

Compositions of Representative Glasses (Mol Percent)

| Ex. | SiO₂ | Li₂O | BeO | CaO | ZnO | MgO | CuO | Al₂O₃ | B₂O₃ | La₂O₃ | Y₂O₃ | Fe₂O₃ | Re₂O₃ | ZrO₂ | TiO₂ | CeO₂ |
|---|---|---|---|---|---|---|---|---|---|---|---|---|---|---|---|---|
| 23 | 16 | 10 | 16 | 16 | — | 16 | — | 16 | — | — | 10 | — | — | — | — | — |
| 24 | 29 | 6 | 15 | 2 | 6 | 10 | 2 | 10 | 10 | — | 10 | — | — | — | — | — |
| 25 | 39 | 6 | 15 | 2 | 6 | 10 | — | 10 | — | — | 10 | 2 | — | — | — | — |
| 26 | 39 | 6 | 6 | — | — | 24 | — | 12 | — | — | 10 | — | — | — | — | 3 |
| 27 | 14 | 13 | 16 | 16 | — | 16 | — | 9 | 6 | — | 10 | — | — | — | — | — |
| 28 | 40 | 10 | 10 | — | — | 10 | 10 | 10 | — | 10 | — | — | — | — | — | — |
| 29 | 20 | 11 | 16 | 14 | — | 10 | — | 9 | 10 | — | 10 | — | — | — | — | — |
| 30 | 39 | 6 | 15 | 2 | 10 | 16 | 2 | — | — | — | 10 | — | — | — | — | — |
| 31 | 39 | 6 | 15 | 8 | 10 | 10 | 2 | — | — | — | 10 | — | — | — | — | — |
| 32 | 39 | 6 | 15 | 2 | 6 | 14 | 2 | 6 | — | — | 10 | — | — | — | — | — |

Table IA — (Weight Percent)

| Example | SiO₂ | Li₂O | BeO | CaO | ZnO | MgO | CuO | Al₂O₃ | B₂O₃ | La₂O₃ | Y₂O₃ | Fe₂O₃ | Re₂O₃ | ZrO₂ | TiO₂ | CeO₂ |
|---|---|---|---|---|---|---|---|---|---|---|---|---|---|---|---|---|
| 1 | 35.4 | 7.1 | 10.8 | 13.2 | | 9.5 | | 24.1 | | | | | | | | |
| 2 | 26.5 | 7.9 | 6.6 | | 21.5 | 10.7 | | 26.9 | | | | | | | | |
| 3 | 24.9 | 4.1 | 3.4 | | 11.2 | 11.1 | | 14.0 | | | 31.2 | | | | | |
| 4 | 29.0 | 4.8 | 4.0 | | 13.1 | 12.9 | | 16.4 | | | | | 19.8 | | | |
| 5 | 21.2 | 4.2 | 5.3 | | 11.5 | 11.4 | | 14.4 | | | 31.8 | | | | | |
| 6 | 21.9 | 3.6 | 3.0 | | 9.9 | 9.8 | | 12.4 | | 39.6 | | | | | | |
| 7 | 28.9 | 7.8 | 12.0 | 14.6 | | 10.5 | | 26.6 | | | | | | | | |
| 8 | 18.8 | 3.7 | 3.1 | | 10.2 | 7.1 | | 12.8 | | | 28.3 | | | | 15.4 | |
| 9 | 22.3 | 3.7 | 6.2 | | 10.1 | 5.0 | | 12.6 | | 40.2 | | | | | | |
| 10 | 16.4 | 4.1 | 0.9 | 7.7 | 7.4 | 7.3 | | 3.5 | 7.9 | | | | 44.8 | | | |
| 11 | 10.6 | 4.2 | 15.0 | 29.7 | 5.8 | 1.4 | | | 7.1 | 23.0 | | | | | 2.8 | |
| 12 | 17.5 | 4.3 | 4.2 | 8.1 | | 5.9 | | | | | | | 47.6 | | 3.9 | |
| 13 | 30.8 | 2.4 | 8.2 | 4.4 | | | | 16.1 | | | 29.7 | | | | | 8.6 |
| 14 | 17.6 | 1.7 | 0.9 | 2.0 | | 9.4 | 1.9 | 9.6 | 11.4 | | 37.0 | 5.6 | | | 2.8 | |
| 15 | 37.2 | 1.2 | 5.2 | | | 8.3 | | 16.8 | | | 31.1 | | | | | |
| 16 | 39.2 | 1.3 | 5.5 | | | 8.8 | | 22.2 | | | 23.0 | | | | | |
| 17 | 38.9 | 1.3 | 6.5 | | | 8.7 | | 22.0 | | | 22.7 | | | | | |
| 18 | 34.2 | 1.2 | 5.1 | | | 8.2 | | 20.7 | | | 30.6 | | | | | |
| 19 | 34.6 | 1.2 | 5.1 | | 3.3 | 8.3 | | 16.7 | | | 30.9 | | | | | |
| 20 | 35.7 | 1.3 | 5.3 | | | 11.4 | | 14.4 | | | 31.9 | | | | | |
| 21 | 34.8 | 2.2 | 6.5 | | | 10.5 | | 13.3 | | | 32.7 | | | | | |
| 22 | 34.1 | 0.9 | 6.4 | | 3.5 | 10.3 | | 13.0 | | | 32.0 | | | | | |
| 23 | 13.6 | 4.1 | 5.6 | 12.7 | | 9.1 | | 23.0 | | | 31.9 | | | | | |
| 24 | 23.5 | 2.4 | 5.1 | 1.5 | 6.6 | 5.4 | 2.1 | 13.7 | 9.4 | | 30.4 | | | | | |
| 25 | 32.3 | 2.5 | 5.1 | 1.5 | 6.7 | 5.6 | | 14.0 | | | 31.1 | 4.4 | | | | |
| 26 | 28.9 | 2.2 | 1.9 | | | 11.9 | | 15.1 | | | 27.9 | | | | | 12.1 |
| 27 | 12.4 | 5.7 | 5.9 | 13.3 | | 9.5 | | 13.6 | 6.2 | | 33.4 | | | | | |
| 28 | 28.5 | 3.6 | 3.0 | | | 4.8 | 9.4 | 12.1 | | 38.6 | | | | | | |
| 29 | 17.2 | 4.7 | 5.7 | 11.3 | | 5.8 | | 13.1 | 10.0 | | 32.3 | | | | | |
| 30 | 34.0 | 2.6 | 5.5 | 1.6 | 11.8 | 9.4 | 2.3 | | | | 32.8 | | | | | |
| 31 | 33.6 | 2.5 | 5.4 | 6.4 | 11.6 | 5.8 | 2.3 | | | | 32.4 | | | | | |
| 32 | 33.1 | 2.5 | 5.3 | 1.6 | 6.9 | 8.0 | 2.2 | 8.6 | | | 31.9 | | | | | |

In order to characterize the various glasses, measurements of the density and Young's modulus of bulk samples as well as Young's modulus of mechanically drawn fibers were made. As a standard density measuring technique, the heavy-liquid-of-known density comparison procedure was used for samples with densities less than 3.00 gms/cm³ while the Archimedean method was employed for samples with densities greater than 3.00 gms/cm³.

Bulk sample for modulus measurement were prepared using the technique whereby the samples were drawn directly from the crucibles of molten glass into fused silica tubes previously dusted lightly with powdered magnesia. Controlled suction for pulling the sample into the tube was supplied by a hypodermic syringe. Since all of the experimental glasses had coefficients of thermal expansion at least higher than that of fused silica, the aspirated bars shrank away from the tube upon cooling and thus were readily removable.

Table II lists the values for a number of glasses made and tested in accordance with the teachings herein.

As is evident from the Tables, several of the formulations have proved to display extremely high modulus as well as modulus/density ratios superior to the best of glass compositions heretofore known. The particular formulation selected in a given application, however, will be dependent usually not only upon the properties of the end product but also upon the cost of the ingredi- Table II Glass Density, Young's Modulus and Specific Modulus

| Example | Density lb./in.³ | Young's Modulus psi × 10⁶ | Specific Modulus 10⁶ in. |
|---|---|---|---|
| 1 | 0.0988 | 18.4 | 186 |
| 2 | 0.1077 | 17.2 | 159 |
| 3 | 0.1280 | 20.2 | 158 |
| 4 | 0.1115 | 17.0 | 153 |
| 5 | 0.1283 | 20.9 | 163 |
| 6 | 0.1413 | 18.9 | 134 |
| 7 | 0.1006 | 19.8 | 197 |
| 8 | 0.1368 | 20.0 | 146 |
| 9 | 0.1383 | 19.4 | 140 |
| 10 | 0.1407 | 18.6 | 132 |
| 11 | 0.1183 | 17.8 | 151 |
| 12 | 0.1293 | 17.3 | 134 |
| 13 | 0.1262 | 19.0 | 150 |
| 14 | 0.1292 | 18.1 | 140 |
| 15 | 0.1193 | 19.6 | 164 |
| 16 | 0.1121 | 19.4 | 172 |
| 17 | 0.1121 | 19.3 | 172 |
| 18 | 0.1185 | 20.2 | 170 |
| 19 | 0.1220 | 19.5 | 161 |
| 20 | 0.1208 | 20.4 | 168 |
| 21 | 0.1207 | 20.6 | 170 |
| 22 | 0.1252 | 20.7 | 165 |
| 23 | 0.1248 | 20.6 | 164 |
| 24 | 0.1165 | 18.2 | 156 |
| 25 | 0.1265 | 19.4 | 154 |
| 26 | 0.1281 | 19.0 | 149 |
| 27 | 0.1164 | 18.2 | 156 |
| 28 | 0.1375 | 16.3 | 119 |
| 29 | 0.1146 | 15.7 | 137 |
| 30 | 0.1297 | 20.0 | 154 |
| 31 | 0.1326 | 20.1 | 152 |
| 32 | 0.1263 | 20.0 | 158 | ents included. This is particularly true in commercial production.

Several of the glasses proved to be fiberizable. In order to evaluate these glasses, a "poor man's bushing" was used to prepare mechanically drawn fibers. The bushing comprises a 20 cm³ platinum crucible with a reinforced bottom and central orifice. The orifice is formed by welding several thicknesses of platinum foil to the bottom of a normal platinum crucible until a bottom thickness of 3/16 in. is obtained. A central orifice 0.088 in. at top, 0.063 in. at bottom and 3/16 in. long in the crucible is made by taper reaming. Once the orifice is made, the crucible is filled with glass and introduced into a platform furnace having high temperature Super-Kanthal hairpin heating elements together with a first ring orifice to provide water cooling immediately below the crucible and a second ring orifice to cool the fiber with helium jets as it forms. The fibers were drawn at speeds of 4,000–8,000 feet/minute and yielded circular glass fibers having a diameter of approximately 1 mil. The fibers were then evaluated on an Instron CRE tester operated with a machine speed of 0.2 in./minute, a chart speed of 20 in./minute, a gage length of 5 in. and a full scale capacity of 1.0 lb. The specimens were held in air actuated clamps with flat rubber coated faces.

Table III lists the values for several glasses which were mechanically drawn into fibers.

Table III

| Example | Fiber Modulus Young's Modulus psi × 10⁶ |
|---|---|
| 13 | 16.8 |
| 15 | 19.8 |
| 16 | 18.8 |
| 17 | 18.5 |
| 18 | 19.0 |
| 19 | 19.6 |

In general for the purposes of this invention, the lower molecular weight divalent oxides are preferable to the higher molecular weight divalent oxides. For example, BeO and MgO are preferred in comparison to CaO which is preferred in comparison to SrO and BaO and ZnO and CuO in comparison to CdO and HgO. Further, the lower weight trivalent oxides $Al_2O_3$, $B_2O_3$ and $Fe_2O_3$ are preferred in comparison to $Ga_2O_3$ and $In_2O_3$ and likewise $Sc_2O_3$, $Y_2O_3$ and $La_2O_3$ (lower molecular weight trivalent oxides of Group IIIB) are preferred in comparison to $Nd_2O_3$, $Sm_2O_3$, $Gd_2O_3$ and $En_2O_3$. Similarly, the lower molecular weight tetravalent oxide $SiO_2$ is preferred to $GeO_2$, $SnO_2$ and $PbO_2$ and the lower molecular weight tetravalent oxides $TiO_2$ and $ZrO_2$ of Group IVB are to be preferred as compared to $HfO_2$ and $ThO_2$. Finally the lowest molecular weight monovalent oxide $Li_2O$ is preferred in comparison to $Na_2O$, $K_2O$, $Rb_2O$ and $Cs_2O$. The above preferences are based on the requirements that the densities of the resulting glasses must be as low as possible, the cohesive bond energy as great as possible, and the field strength of the ions as high as possible.

Of course, the glass compositions may contain certain additional tetravalent or sesquivalent oxides or fluorides commonly employed in optical glassmaking such as tantalum pentoxide ($Ta_2O_5$) or tungsten trioxide ($WO_3$) in minor amounts.

While the invention has been described in connection with a number of particular preferred embodiments, they are considered illustrative only and no limitation is intended thereby. Various alterations and modifications will be evident to those skilled in the art within the true spirit and scope of the invention as set forth in the appended claims.

What is claimed is:

1. A fiberizable glass composition having a Young's modulus of approximately 19 million psi and a specific modulus of approximately 150 million inches consisting essentially of about, in mols:
   39% $SiO_2$; 6% $Li_2O$; 25% BeO; 6% CaO; 12% MgO; 12% $Al_2O_3$; 10% $Y_2O_3$ and 2% $CeO_2$.

2. A fiberizable glass composition having a Young's modulus of at least 19 million psi and a specific modulus of at least 160 million inches consisting essentially of, in mols:
   42–45% $SiO_2$; 3% $Li_2O$; 15–18% BeO; 12–15% MgO; 12–15% $Al_2O_3$ and 7–10% $Y_2O_3$.

3. A fiberizable glass composition having a Young's modulus of at least 19 million psi and a specific modulus of at least 160 million inches consisting essentially of about, in mols:
   42% $SiO_2$; 3% $Li_2O$; 15% BeO; 3% ZnO; 15% MgO; 12% $Al_2O_3$ and 10% $Y_2O_3$.

* * * * *

PO-1050
(5/69)

UNITED STATES PATENT OFFICE
CERTIFICATE OF CORRECTION

Patent No. 3,785,836  Dated January 15, 1974

Inventor(s) JAMES F. BACON

It is certified that error appears in the above-identified patent and that said Letters Patent are hereby corrected as shown below:

Column 2, line 15:  "$ZnO_2$" should read --$ZrO_2$--.

Signed and sealed this 21st day of May 1974.

(SEAL)
Attest:

EDWARD M. FLETCHER, JR.  C. MARSHALL DANN
Attesting Officer  Commissioner of Patents